United States Patent [19]

Kurihara et al.

[11] 4,177,179

[45] Dec. 4, 1979

[54] AQUEOUS COLD SETTING PAINT

[75] Inventors: Kenji Kurihara, Atsugi; Shigekazu Kasahara, Sagamihara; Takashi Suzuki, Chofu, all of Japan

[73] Assignee: Toyo Soda Manufacturing Co., Ltd., Yamaguchi, Japan

[21] Appl. No.: 930,697

[22] Filed: Aug. 3, 1978

[30] Foreign Application Priority Data

Aug. 26, 1977 [JP] Japan ............................. 52/101732

[51] Int. Cl.$^2$ ............................................. C08L 39/00
[52] U.S. Cl. ................... 260/29.6 NR; 260/29.6 TA; 526/277
[58] Field of Search ............... 260/29.6 NR, 29.6 TA; 526/277

Primary Examiner—Paul R. Michl
Attorney, Agent, or Firm—Oblon, Fisher, Spivak, McClelland & Maier

[57] ABSTRACT

In an aqueous cold setting paint, a specific copolymer and an epoxy resin being soluble in an alcoholic sovlent are incorporated.

The specific copolymer is obtained by a solution polymerization of (a) a monomer having ethylenic unsaturated double bond and a nitrogen-containing base, (b) a monomer having ethylenic unsaturated double bond and a phosphoric acid group or a salt thereof or an ester thereof, (c) a monomer having ethylenic unsaturated double bond and carboxylic acid group or a salt thereof and (d) a monomer having ethylenic unsaturated double bond which is copolymerizable with a component (a), (b) or (c) or further treatment of the resulting copolymer with a base.

17 Claims, No Drawings

AQUEOUS COLD SETTING PAINT

BACKGROUND OF THE INVENTION

1. Field of the Invention:

The present invention relates to a novel aqueous cold setting paint which is preferably used as paints for outer parts, iron constructions and concretes.

2. Description of the Prior Arts:

The cold setting paints used for these usages can be classified to solvent type paints and aqueous type paints. The solvent type paints have been mainly used. However, it has been required to use the aqueous type paints instead of the solvent type paints from the viewpoints of environmental problem, fire, labour safety and hygiene problems.

The aqueous type paints are further subclassified to emulsion type paints, microemulsion type paints and water soluble type paints.

The emulsion type paints have been widely used in practice. However, the emulsion type paints have inferior to the conventional solvent type paints since the water resistance and the durability are disadvantageously low.

The water soluble type paints can not be replaced to the conventional solvent type paints since the water resistance, the durability and the weathering resistance are remarkably low.

The microemulsion type paints have been developed but they can not be replaced to the conventional solvent type paints since the chemical resistance and the weathering resistance are still inferior in the present technical level.

There have been many paints which are hardened by a heating or a radiation. Various processes for preparing these type paints have been known. However, it has been rare to obtain an aqueous cold setting paint.

Processes for preparing emulsions of vinyl type polymers with an emulsifier of a maleinized polybutadiene have been disclosed in Japanese Pat. Publication No. 43381/1974 and Japanese Unexamined Pat. Publications Nos. 73488/1973 and 34683/1972. However, the emulsions obtained by these processes have disadvantages of inferior alkali resistance and weathering resistance.

Aqueous compositions containing a drying oil, a semidrying oil and an unsaturated aliphatic acid or a derivative thereof or processes for preparing the compositions have been disclosed in Japanese Pat. Nos. 32414/1972, 4214/1975 and 18503/1975. However, the compositions obtained by these processes have disadvantages of inferior alkali resistance and weathering resistance.

In order to overcome these disadvantages, the inventors have studied and found that aqueous paints prepared by admixing a specific acryl type copolymer with a water soluble epoxy resin have excellent solvent resistance, weathering resistance, chemical resistance, water resistance, adhesiveness, processibility and economical advantage.

The inventors have further studied to improve these aqueous paints and have found that aqueous paints comprising a specific copolymer and an alcoholic solvent soluble epoxy resin impart superior water resistance. The present invention has been attained by the finding.

SUMMARY OF THE INVENTION

It is an object of the present invention to overcome these disadvantages and to provide an aqueous cold setting paint which imparts excellent characteristics being superior to those of the conventional solvent type paints.

It is another object of the present invention to obtain an improved aqueous cold setting paint which has excellent water resistance.

The foregoing and other objects of the present invention have been attained by providing an aqueous cold setting paint which comprises (A) a copolymer obtained by a solution polymerization of
 (a) a monomer having ethylenic unsaturated double bond and a nitrogen-containing base,
 (b) a monomer having ethylenic unsaturated double bond and a phosphoric acid group or a salt thereof or an ester thereof,
 (c) a monomer having ethylenic unsaturated double bond and carboxylic acid group or a salt thereof, and
 (d) a monomer having ethylenic unsaturated double bond which is copolymerizable with the component (a), (b) or (c); or (B) a copolymer obtained by treating the copolymer (A) with a base and (C) an epoxy resin being soluble in an alcoholic solvent.

DETAILED DESCRIPTION OF THE PREFERRED EMBODIMENTS

The monomers used in the present invention will be illustrated as follows.

(a) The monomers having ethylenic unsaturated double bond and a nitrogen-containing base include, (1) aminoalkyl acrylates (monomers) having the formula

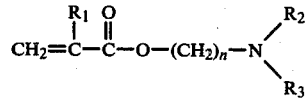

wherein $R_1$ represents hydrogen or a halogen atom or a $C_1$–$C_5$ alkyl group; and $R_2$ represents hydrogen atom or a $C_1$–$C_6$ alkyl group and $R_3$ represents hydrogen atom or a $C_1$–$C_6$ alkyl group and n represents an integer of 1 to 6, for example acrylates such as dimethylamino methyl acrylate, diethylamino methyl acrylate, dibutylamino methyl acrylate, dihexylamino methyl acrylate, methylamino methyl acrylate, butylamino methyl acrylate, dimethylamino ethyl acrylate, diethylamino ethyl acrylate, di(t-butyl)amino ethyl acrylate, diisohexylamino ethyl acrylate, methylamino ethyl acrylate, butylamino ethyl acrylate, amylamino ethyl acrylate, cyclohexylamino ethyl acrylate, dihexylamino propyl acrylate, di(t-butyl)amino hexyl acrylate and hexylamino hexyl acrylate; and methacrylates such as dimethylamino ethyl methacrylate, diethylamino ethyl methacrylate, dimethylamino pentacrylate and dimethylamino chloroacrylate.

(2) the vinyl pyridines such as 4-vinyl pyridine, 2-vinyl pyridine and 2-methyl-5-vinylpyridine.

One or more than one of the monomers can be used.

The amount of the monomers is usually in a range of 0.01 to 20 wt.% preferably 0.5 to 8 wt.% based on the total monomers.

When the content of the monomer is less, the solvent resistance is inferior whereas when the content of the monomer is greater, the chemical resistance is inferior.

It is most preferable to use dimethylamino ethyl methacrylate or 4-vinyl pyridine as the monomer having nitrogen-containing base group.

(b) The monomers having ethylenic unsaturated double bond and a phosphoric acid group, a salt thereof or an ester thereof include monomers having the formula

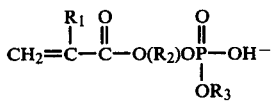

wherein $R_1$ represents hydrogen atom or a $C_1$-$C_5$ alkyl group and $R_2$ represents a $C_2$-$C_{10}$ straight chain or branched chain alkylene group or a halogen substituent of the alkylene group and $R_3$ represents hydrogen atom or a $C_1$-$C_{10}$ alkyl group and salts such as ammonium, amine, sodium and potassium salts thereof and esters thereof, for examples, primary phosphoric esters of acrylates and methacrylates having hydroxyl group such as mono(2-hydroxyethyl acrylate) acid phosphate, mono(2-hydroxyethyl methacrylate) acid phosphate, mono(2-hydroxypropyl acrylate) acid phosphate, mono(2-hydroxypropyl methacrylate) acid phosphate, mono(3-hydroxypropyl acrylate) acid phosphate, mono(3-hydroxypropyl methacrylate) acid phosphate and mono(3-chloro-2-hydroxypropyl methacrylate) acid phosphate, and salts thereof and esters thereof.

One or more than one of the monomers can be used.

The amount of the monomer is usually in a range of 0.01 to 20 wt.% preferably 0.5 to 8 wt.% based on the total monomers.

When the content of the monomer is less, the solvent resistance is inferior whereas when the content of the monomer is greater, the chemical resistance is inferior.

It is most preferable to use mono(2-hydroxyethyl methacrylate) acid phosphate or amine salt thereof.

(c) The monomers having ethylenic unsaturated double bond and a carboxylic acid group or salts thereof include acrylic acid, methacrylic acid, maleic acid, and itaconic acid and salts thereof.

One or more than one of the monomers can be used.

The amount of the monomer is usually in a range of 0.01 to 20 wt.% preferably to 0.5 to 8 wt.% based on the total monomers.

(d) The monomers having ethylenic unsaturated double bond which is copolymerizable with the component (a), (b) or (c) include, (1) nonfunctional monomers for example, acrylates such as methyl acrylate, ethyl acrylate, isopropyl acrylate, n-butyl acrylate, 2-ethylhexyl acrylate and cyclohexyl acrylate; methacrylates such as methyl methacrylate, ethyl methacrylate, isopropyl methacrylate, n-butyl methacrylate, 2-ethylhexyl methacrylate, and cyclohexyl methacrylate; aliphatic acid vinyl esters such as vinyl acetate, vinyl propionate, vinyl butyrate and vinyl stearate; aromatic monoolefins such as styrene, chlorostyrene, α- or β-methyl styrene and vinyl toluene; vinyl esters such as methyl vinyl ether, ethyl vinyl ether, isobutyl vinyl ether, octyl vinyl ether, lauryl vinyl ether, stearyl vinyl ether, phenyl vinyl ether, alkyl substituted phenyl vinyl ether and ethoxyphenyl vinyl ether; and others such as acrylonitrile and methacrylonitrile;

(2) functional monomers for example, hydroxyalkyl acrylates such as 2-hydroxyethyl acrylate, 2-hydroxypropyl acrylate and 3-hydroxypropyl acrylate; hydroxyalkyl methacrylates such as 2-hydroxyethyl methacrylate, 2-hydroxypropyl methacrylate and 3-hydroxypropyl methacrylate, nitrogen-containing unsaturated compounds such as acrylamide, ethyl acrylamide, vinyl pyrrolidone and vinyl methyl imidazole; hydroxy group containing unsaturated compounds such as allyl alcohol, and N-methylol acrylamide; sulfur containing unsaturated compounds such as sulfomethyl acrylate, 2-sulfoethyl methacrylate, vinyl sulfonic acid and paratoluene sulfonic acid and salts thereof.

One or more than one of the monomers can be used.

The amount of the monomer is usually in a range of 0 to 20 wt.% preferably 0 to 8 wt.% based on the total monomers.

When the content of the monomer is greater, the durability and the chemical resistance is inferior.

The copolymer (A) obtained by using the components (a), (b), (c) and (d) or the copolymers (B) obtained by adding a base can be prepared by a conventional solution polymerization.

In this case, it is possible to use a solvent, an organic solvent or an aqueous solution containing a solvent.

Suitable solvents include alcohols such as methanol, ethanol, isopropanol and butanol; cellosolves such as methyl cellosolve, ethyl cellosolve and butyl cellosolve; and ethyl acetate, methyl ethyl ketone, toluene and xylene and mixtures of water and a solvent.

One or more than one solvent can be used.

It is especially effective to use isopropanol.

The monomers can be charged at the beginning of the polymerization or can be sequentially added during the polymerization.

The copolymers (B) can be also prepared by adding a base such as ammonia, monomethylamine, dimethylamine, trimethylamine, monoethylamine, triethylamine, ethylenediamine, pyridine, sodium hydroxide, potassium hydroxide and dimethylamino ethanol to the copolymer (A) after the polymerization.

It is preferable to add amines especially effective to add triethylamine.

The epoxy resins being soluble in an alcoholic solvent are compounds having two or more epoxides which are soluble in ethyl cellosolve but sparingly soluble (substantially insoluble) in water.

Suitable epoxy resins include aliphatic polyglycidyl ethers such as neopentylglycol diglycidyl ether, 1,6-hexanediol diglycidyl ether, trimethylolpropane triglycidyl ether, and glycerine triglycidyl ether; aromatic diglycidyl ethers such as 2,2-bis(4-hydroxyphenyl)propane diglycidyl ether and polyoxyalkylene bisphenol A glycidyl ether; alicyclic diglycidyl ethers such as 2,2-bis(4-hydroxycyclohexyl)propane diglycidyl ether, cyclohexanediol glycidyl ether and polyoxyalkylene hydrogenated bisphenol A diglycidyl ether, glycidyl amines such as diglycidyl aniline.

It is most preferable to use trimethylpropane triglycidyl ether as the epoxy resin being soluble in an alcoholic solvent.

One or more than one epoxy resins can be used.

The amount of the epoxy resin being soluble in an alcoholic solvent is usually in a range of 0.1 to 98 wt.% preferably 1 to 50 wt.% based on the total amounts of the copolymer (A) or the copolymer (B) and the expoxy resin.

The aqueous paint comprising the copolymer (A) or the copolymer (B) and the epoxy resin (C) being soluble in an alcoholic solvent can be prepared by the conventional simple mechanical processes such as blending and kneading. It is also possible to add water soluble or hydrophilic solvents such as acetone, isopropanol, ethyl cellosolve, butanol and methyl ethyl ketone.

In the preparation of the paint, suitable commercially available pigments and additives can be incorporated, and suitable conventional apparatus for preparing a paint such as a ball mill, a sand grind mill and a three rolling mill, can be used.

The aqueous cold setting paints of the present invention have the following significant industrial effects and advantages.

(1) The paints are aqueous paints whereby they are advantageous from the viewpoints of saving of raw materials, environmental problem, fireproof and labour safety and hygiene.

(2) The paints are cold settable whereby savings of energy and raw materials can be expected.

(3) The paints are cold settable whereby any energy source (apparatus) such as heat source and radiation source is not required in the application to be advantageous in industrial applications.

(4) It is possible to remarkably increase a setting speed by heating it with a simple heat source and to increase processing efficiency.

(5) The aqueous cold setting paints of the present invention have excellent solvent resistance, chemical resistance, weathering resistance, adhesiveness processibility and economical advantage whereby they can be used for various applications.

Having now generally described the invention, a further understanding can be attained by reference to certain specific Examples which are provided herein for purposes of illustration only and are not intended to be limiting in any manner, unless otherwise specified.

EXAMPLE 1

In a 1 liter reactor equipped with a stirrer and a condenser, 170 wt.parts of isopropyl alcohol was charged and the reactor was purged with nitrogen and a mixture of 3 wt.parts of dimethylamino ethyl acrylate, 2 wt.parts of mono(2-hydroxyethyl methacrylate) acid phosphate, 5 wt.parts of methacrylate, 30 wt.parts of styrene, 61 wt.parts of methyl methacrylate, 99 wt.parts of ethyl acrylate, 3 wt.parts of triethylamine, 20 wt.parts of isopropyl alcohol and 1.6 wt.part of azobisisobutyronitrile was added dropwise to the isopropyl alcohol under stirring during 2 hours. Two hours after the addition, 10 wt.parts of isopropyl alcohol and 0.4 wt.part of azobisisobutyronitrile were added to the mixture and a solution polymerization was continued at 82° C. for 2 hours to obtain a copolymer (A).

Then, 267 wt.parts of water was added to the copolymer (A) and the mixture was stirred for 30 minutes and 210 wt.parts of the solvent was removed at 75° to 80° C. under a reduced pressure and 66 wt.parts of ethyl cellosolve and 3 wt.parts of triethylamine were added to the residue. The mixture was stirred at 82° C. for 1 hour to obtain an aqueous resin slurry (B) having a solid content of 37.7%, pH of 9.3 and a viscosity of 1200 cps (rotary viscometer: 20° C.).

Then, 28 wt.parts of a rutile form titanium oxide was added to 100 wt.parts of the aqueous resin slurry and the mixture was kneaded in a test paint shaker and 2 wt.parts of trimethylolpropane triglycidyl ether was added to the mixture to obtain a paint. The paint was coated on a concrete. The coated layer was kept at 72 hours in the room and tests for the paint were carried out. The results are shown in Table 1.

REFERENCE 1

In accordance with the process of Example 1 the polymerization was carried out without using dimethylamino ethyl ethacrylate and the resulting copolymer was used for the preparation of the paint and the tests were carried out. The results are shown in Table 1.

REFERENCE 2

In accordance with the process of Example 1, the polymerization was carried out except using methacrylate instead of mono(2-hydroxyethyl methacrylate) acid phosphate and the resulting copolymer was used for the preparation of the paint and the tests were carried out. The results are shown in Table 1.

EXAMPLE 2

In a 1 liter reactor equipped with a stirrer and a condenser, 150 wt.parts of isopropyl alcohol and 50 wt.parts of ethyl cellosolve were charged and the reactor was purged with nitrogen and a mixture of 10 wt.parts of 4-vinyl pyridine, 6 wt.parts of mono(2-hydroxyethyl methacrylate) acid phosphate, 6 wt.parts of acrylic acid, 83 wt.parts of methyl methacrylate, 95 wt.parts of ethyl acrylate, 6 wt.parts of triethylamine, 30 wt.parts of isopropyl alcohol and 1.6 wt.parts of benzoyl peroxide was added dropwise during 4 hours. Two hours after the addition, 20 wt.parts of isopropyl alcohol and 0.4 wt.part of benzoyl peroxide were added to the mixture and the solution polymerization was continued at 80° C. for 4 hours to obtain a copolymer (A).

Then, 280 wt.parts of water was added to the copolymer (A) and the mixture was stirred for 30 minutes and then, 200 wt.parts of the solvent was removed at 75° to 80° C. under a reduced pressure and then, the residue was cooled to 50° C. and 15 wt.parts of 10% ammonia water was added and the mixture was stirred for 1 hour to obtain an aqueous resin slurry (B) having a solid content of 34.7%, pH of 9.5 and a viscosity of 5700 cps (rotary viscometer: 20° C.).

Then, 26 wt.parts of a rutile form titanium oxide and 100 wt.parts of the aqueous resin slurry (B) were kneaded in a ball mill and 10 wt.parts of 2,2-bis(4-hydroxycyclohexyl)propane diglycidyl ether to obtain a paint. The paint was coated on an aqueous primer-precoated mild steel sheet.

The coated layer was kept for 48 hours in the room and tests for the paint were carried out. The results are shown in Table 1.

REFERENCE 3

In accordance with the process of Example 2, the polymerization was carried out without using 4-vinyl pyridine and the resulting copolymer was used for the preparation of the paint and the tests were carried out. The results are shown in Table 1.

REFERENCE 4

In accordance with the process of Example 2, the polymerization was carried out except using acrylic acid instead of mono(2-hydroxyethyl methacrylate) acid phosphate and the resulting copolymer was used for the preparation of the paint and the tests were carried out. The results are shown in Table 1.

EXAMPLE 3

In a 1 liter reactor equipped with a stirrer and a condenser, 150 wt.parts of isopropyl alcohol was charged and the reactor was purged with nitrogen and a mixture of 5 wt.parts of dimethyl aminoethyl methacrylate, 4 wt.parts of mono(3-chloro-2-hydroxypropyl methacrylate) acid phosphate, 8 wt.parts of itaconic acid, 8 wt.parts of 2-hydroxyethyl methacrylate, 80 wt.parts of methyl methacrylate, 95 wt.parts of ethyl acrylate, 50 wt.parts of isopropyl alcohol and 1 wt.parts of azobiscyano valoric acid was added dropwise under refluxing with stirring during 3 hours. After the addition, the solution polymerization was continued at 82° C. for 5 hours to obtain a copolymer (A).

Then, 270 wt.parts of water and 2 wt.parts of dimethylamino ethanol were added to the copolymer (A) and the mixture was stirred for 30 minutes and 180 wt.parts of the solvent was removed at 75° to 80° C. under a reduced pressure and 50 wt.parts of butyl cellosolve and 10 wt.parts of triethylamine were added and the mixture was stirred at 75° C. for 30 minutes to obtain an aqueous resin slurry (B) having a solid content of 34.5%, pH of 9.7 and a viscosity of 8500 cps (rotary viscometer: 20° C.).

Then, 28 wt.parts of a rutile form titanium dioxide was added to 100 wt.parts of the aqueous resin slurry and the mixture was kneaded in a test paint shaker and 5 wt.parts of neopentylglycol glycidyl ether was added to the mixture to obtain a paint. The paint was coated on an aqueous primer-precoated mild steel sheet. The coated layer was kept at 72 hours in the room and tests for the paint were carried out. The results are shown in Table 1.

REFERENCE 5

In accordance with the process of Example 3, the polymerization was carried out without using dimethyl-amino ethyl methacrylate, and the resulting copolymer was used for the preparation of the paint and the tests were carried out. The results are shown in Table 1.

REFERENCE 6

In accordance with the process of Example 3, the polymerization was carried out except using acrylic acid instead of mono(3-chloro-2-hydroxypropyl methacrylate) acid phosphate and the resulting copolymer was used for the preparation of the paint and the tests were carried out. The results are shown in Table 1.

| Tests | | Exp. 1 | Ref. 1 | Ref. 2 | Exp. 2 | Ref. 3 | Ref. 4 | Exp. 3 | Ref. 5 | Ref. 6 |
| --- | --- | --- | --- | --- | --- | --- | --- | --- | --- | --- |
| Adhesiveness | *1 | 5 | 4 | 2 | 5 | 4 | 3 | 5 | 3 | 3 |
| Hardening | *2 | 4 | 1 | 3 | 5 | 1 | 3 | 5 | 1 | 3 |
| Pencile hardness | *3 | F | F | F | HB | HB | HB | HB | HB | HB |
| Water resistance | *4 | 5 | 2 | 2 | 5 | 2 | 2 | 4 | 1 | 2 |
| Alkali resistance | *5 | 5 | 2 | 2 | 5 | 1 | 2 | 5 | 2 | 2 |
| Acid resistance | *6 | 5 | 4 | 3 | 3 | 2 | 2 | 4 | 2 | 2 |
| Weathering | *7 | 5 | 2 | 2 | 5 | 1 | 1 | 5 | 1 | 1 |

Note:
*1 Chess board cut test;
*2 Toluene finger scraping test;
*3 Japanese Industrial Standard K-5400;
*4 Dipping test in water for 7 days;
*5 Dipping test in 5% NaOH for 24 hours;
*6 Dipping test in 5% H₂SO₄ for 24 hours;
*7 Exposing test in natural condition for 6 months.
In the tests *1, *2, and *3, a mild steel sheet was used as a test piece.
Rating:
5 excellent
4 good
3 fair
2 slightly bad
1 bad

What is claimed is:
1. An aqueous cold setting paint which comprises
(A) a copolymer obtained by a solution polymerization of
  (a) a monomer having ethylenic unsaturated double bond and a nitrogen-containing base,
  (b) a monomer having ethylenic unsaturated double bond and a phosphoric acid group or a salt thereof or an ester thereof,
  (c) a monomer having ethylenic unsaturated double bond and carboxylic acid group or a salt thereof, and
  (d) a monomer having ethylenic unsaturated double bond which is copolymerizable with the component (a), (b) or (c); or
(B) a copolymer obtained by treating the copolymer (A) with a base and
(C) an epoxy resin being soluble in an alcoholic solvent.
2. An aqueous cold setting paint according to claim 1 wherein the monomer having ethylenic unsaturated double bond and a nitrogen-containing base is a monomer having the formula

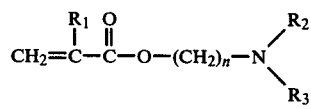

wherein $R_1$ represents hydrogen or a halogen atom or a $C_1$–$C_5$ alkyl group and $R_2$ represents hydrogen atom or a $C_1$–$C_6$ alkyl group and $R_3$ represents hydrogen atom or a $C_1$–$C_6$ alkyl group and n represents an integer of 1 to 6, or a vinyl pyridine.
3. An aqueous cold setting paint according to claim 1 or 2 wherein the monomer having ethylenic unsaturated double bond and a phosphoric acid group, a salt thereof or an ester thereof is a monomer having the formula

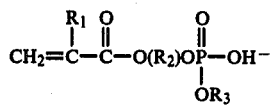

wherein $R_1$ represents hydrogen atom or a $C_1$-$C_5$ alkyl group and $R_2$ represents a $C_2$-$C_{18}$ straight chain or branched chain alkylene group or a halogen substituent thereof and $R_3$ represents hydrogen atom or $C_1$-$C_{10}$ alkyl group.

4. An aqueous cold setting paint according to claim 1 or 2 wherein the monomer having ethylenic unsaturated double bond and a nitrogen-containing base is dimethylaminoethyl methacrylate or 4-vinyl pyridine.

5. An aqueous cold setting paint according to claim 1 or 2 wherein the monomer having ethylenic unsaturated double bond and a phosphoric acid group, a salt thereof or an ester thereof is mono(2-hydroxyethyl methacrylate) acid phosphate or an amine salt thereof.

6. An aqueous cold setting paint according to claim 1 or 2, wherein the epoxy resin being soluble in an alcoholic solvent is trimethylolpropane triglycidyl ether.

7. An aqueous cold setting paint according to claim 3, wherein the monomer having ethylenic unsaturated double bond and a nitrogen-containing base is dimethylaminoethyl methacrylate or 4-vinyl pyridine.

8. An aqueous cold setting paint according to claim 3, wherein the monomer having ethylenic unsaturated double bond and a phosphoric acid group, a salt thereof or an ester thereof is mono(2-hydroxyethyl methacrylate) acid phosphate or an amine salt thereof.

9. An aqueous cold setting paint according to claim 4, wherein the monomer having ethylenic unsaturated double bond and a phosphoric acid group, a salt thereof or an ester thereof is mono(2-hydroxyethyl methacrylate) acid phosphate or an amine salt thereof.

10. An aqueous cold setting paint according to claim 7, wherein the monomer having ethylenic unsaturated double bond and a phosphoric acid group, a salt thereof or an ester thereof is mono(2-hydroxyethyl methacrylate) acid phosphate or an amine salt thereof.

11. An aqueous cold setting paint according to claim 3, wherein the epoxy resin being soluble in an alcoholic solvent is trimethylpropane triglycidyl ether.

12. An aqueous cold setting paint according to claim 4, wherein the epoxy resin being soluble in an alcoholic solvent is trimethylpropane triglycidyl ether.

13. An aqueous cold setting paint according to claim 7, wherein the epoxy resin being soluble in an alcoholic solvent is trimethylolpropane triglycidyl ether.

14. An aqueous cold setting paint according to claim 5, wherein the epoxy resin being soluble in an alcoholic solvent is trimethylolpropane triglycidyl ether.

15. An aqueous cold setting paint according to claim 8, wherein the epoxy resin being soluble in an alcoholic solvent is trimethylolpropane triglycidyl ether.

16. An aqueous cold setting paint according to claim 9, wherein the epoxy resin being soluble in an alcoholic solvent is trimethylolpropane triglycidyl ether.

17. An aqueous cold setting paint according to claim 10, wherein the epoxy resin being soluble in an alcoholic solvent is trimethylolpropane triglycidyl ether.

* * * * *